Sept. 25, 1934.   N. J. DZIEDZIC   1,974,602
SLICING MACHINE
Filed Aug. 3, 1931   2 Sheets-Sheet 1

Nickolas J. Dziedzic
INVENTOR

WITNESS

BY
ATTORNEY

Sept. 25, 1934.  N. J. DZIEDZIC  1,974,602
SLICING MACHINE
Filed Aug. 3, 1931   2 Sheets-Sheet 2

Nickolas J. Dziedzic
INVENTOR

BY Roy W. Johns.
ATTORNEY

WITNESS-

Patented Sept. 25, 1934

1,974,602

UNITED STATES PATENT OFFICE 1,974,602

SLICING MACHINE

Nickolas J. Dziedzic, Chicago, Ill., assignor, by mesne assignments, to Industrial Patents Corporation, Chicago, Ill., a corporation of Delaware Application August 3, 1931, Serial No. 554,631

5 Claims. (Cl. 146—95)

The invention relates generally to article slicing machines and specifically to apparatus for slicing bacon, whereby uniformity of slices is assured, the same being accomplished by associating with the knife a gauge which is rotatable therewith and functions as a stop without interfering with the free discharge of the slices.

Within the purview of the invention the feed mechanism for the article, or bacon, may be continuous or intermittent, according to the type of machine for which the invention is adapted.

The vital feature of the invention is the provision of a machine which eliminates irregular slices at the ends of slabs of bacon, commonly resulting when the ordinary clamping devices are employed for holding the bacon while being sliced.

Inasmuch as the invention relates to the cutting mechanism and the gauge, or stop, associated therewith, these parts only are illustrated in the accompanying drawings and referred to in the specification, together with a portion of the feeding mechanism and article holding means.

For a full understanding of the invention and the merits thereof, reference is to be had to the drawings hereto attached and the subjoined description in which corresponding parts are designated in the several views of the drawings and referred to in the specification by like reference characters.

In the drawings:—

Figure 3:
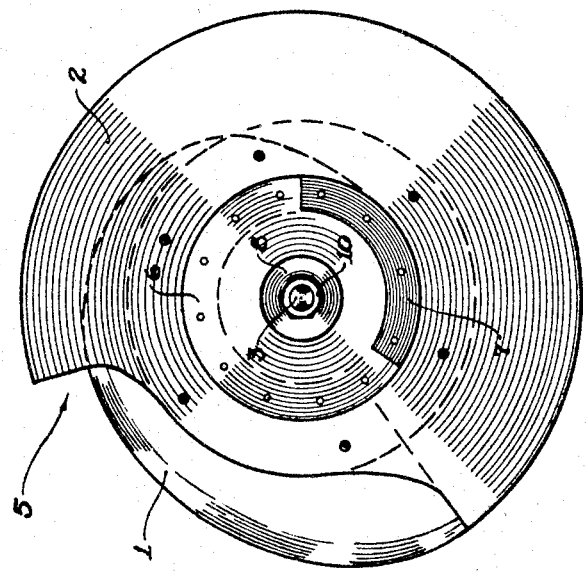
Fig. 3 is a front view of the parts shown in Figs. 1 and 2.
Figure 2:
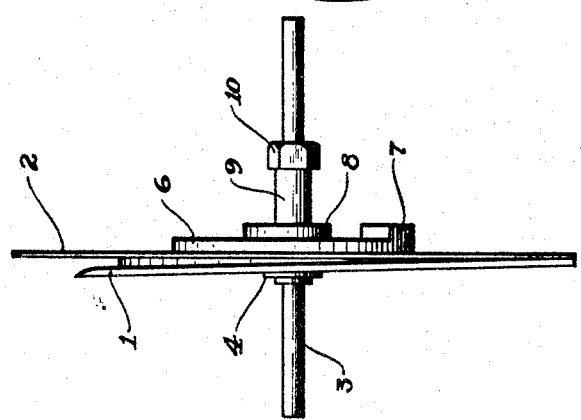
Fig. 2 is a side view of the parts shown in Fig. 1.

The numeral 1 designates the cutter or knife and 2 the gauge, or stop. The cutter 1 and gauge 2 are mounted upon a shaft 3 and secured thereto in predetermined relation to rotate therewith.

The cutter or knife 1 is of cam formation disposed spirally on the shaft 3 and thereby deflected laterally into spiral formation to correspond to the thickness of the slice into which the bacon, or other article, is to be cut and permitting a feed of the material equal to the thickness of a slice cut by the knife and controlling the said feed. A shoulder 4 is provided upon the shaft 3 and the cutter is clamped thereagainst.

Figure 1:
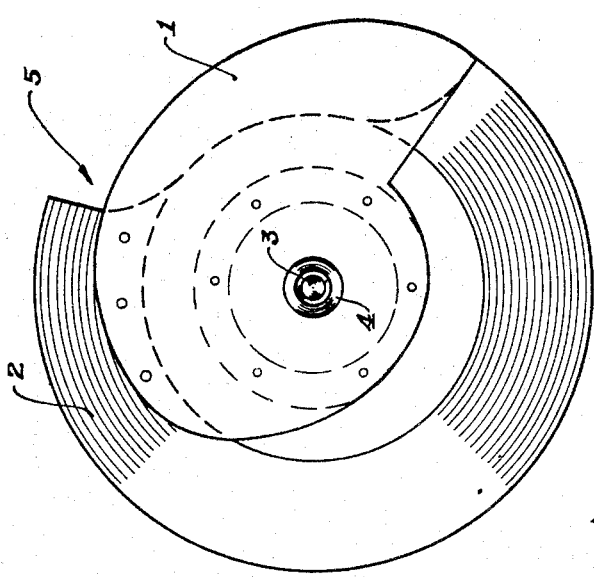
Figure 1 is a rear elevational view of a cutter and coacting gauge, or stop, illustrative of an embodiment of the invention.
Figure 4:
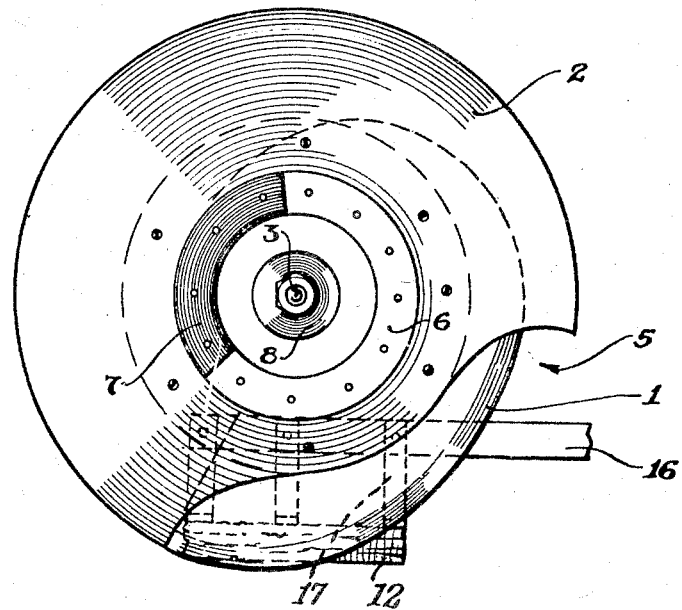
Fig. 4 is a view similar to Fig. 3 showing a slab of bacon in position for slicing.
Figure 5:
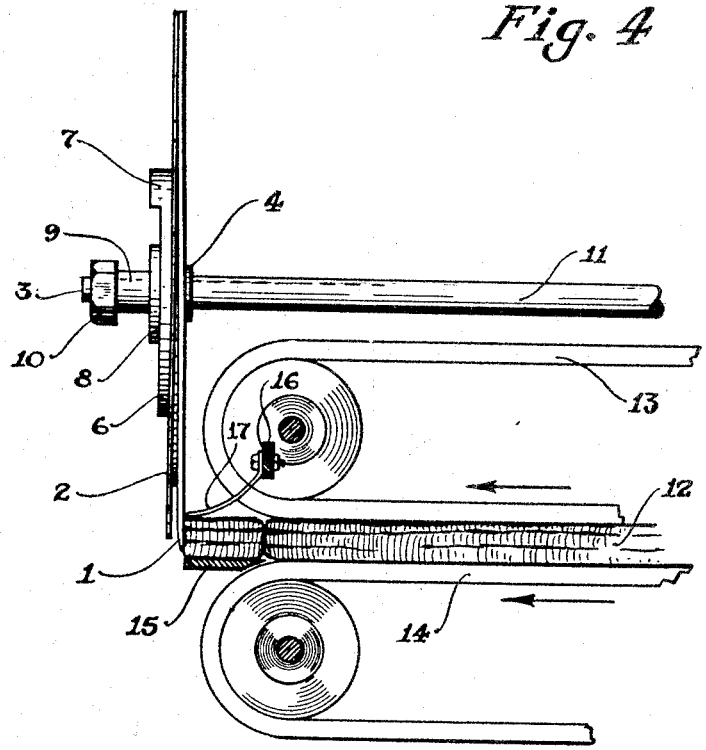
Fig. 5 is a side view showing an endless feeding mechanism for advancing the bacon to be sliced.

The gauge, or stop 2, is of disk formation and of a diameter corresponding to the diameter of a circle defined by the highest point of the cutter when the latter is rotated. The gauge 2 which is contiguous to the knife is arranged in a plane perpendicular to the shaft and it forms a positive stop for the product being sliced, the knife forming a helix of a pitch equal to the desired thickness of the knife for feeding the material being cut the thickness of a slice during each complete revolution of the knife. When the knife is not cutting the perpendicular gauge forms a stop for the material so that the latter is properly positioned for the next cutting operation. A peripheral portion of the disk gauge 2 is cut away, as indicated at 5. Opposite end portions of the cut away part 5 are similar. The cutting edge of the knife 1 is disposed opposite the cut away part 5 of the gauge, as indicated most clearly in Figs. 1, 3 and 4 of the drawings so as not to interfere with the free discharge of the slices. The peripheral portion of the gauge disk 2 between the cut away portion 5 forms, in effect, the stop to position the bacon so as to assure cutting of slices of uniform thickness.

A plate 6 of circular outline is secured to the disk gauge 2 and forms a reinforcement therefor and is centrally pierced to admit of the passage therethrough of the shaft 3. An outer portion of the plate 6 is thickened as indicated at 7, to provide a counterbalance for the cutter and gauge. A washer 8 and spacer 9 are clamped against the plate 6 by a nut 10 threaded on the shaft 3. When the parts are assembled the shaft 3 passes through a tube 11 and the cutter 1 and gauge 2 are clamped between the shoulder 4 and nut 10.

In an organized machine the slabs of bacon 12 are held between adjacent runs of upper and lower endless conveyors 13 and 14 respectively. These conveyors are reversely driven at a uniform speed with the result that the adjacent runs with the bacon 11 therebetween travel in the same direction and advance or feed the article to be sliced. A support 15 is disposed forwardly of the upper run of conveyor 14 and constitutes a support for the bacon adjacent the cutting mechanism. A holder is located above the support 15 and prevents vertical displacement of the bacon adjacent the cutting mechanism. This holder consists of a strip 16 and a plurality of spring fingers 17 which engage the bacon 12 at different points and exert a downward pressure thereon to hold the bacon upon the support 15. When an intermittent feed is employed instead of the continuous feed, as shown, the gauge disk 2 and knife or cutter 1 will be disposed in spaced parallel planes.

What is claimed is:—

1. In a slicing machine, a rotatable knife deflected laterally into spiral formation, and a gauge plate contiguous to and rotatable with the knife and forming a positive stop for the product being sliced, said knife forming a helix of pitch equal to the desired slice thickness and permitting and controlling the feed of the material being sliced.

2. In a slicing machine, a rotary cam-shaped knife deflected laterally into spiral formation, and a disk gauge contiguous to and rotatable with the knife and having a peripheral portion cut away opposite the effective cutting edge of the knife, the peripheral portion of the gauge between the ends of the cutting edge of the knife forming a positive stop for the product being sliced and said knife forming a helix of pitch equal to the desired slice thickness and permitting and controlling the feed of the product being sliced.

3. In a slicing machine, a shaft, a cam-shaped knife secured to the shaft and having a portion deflected laterally into spiral or helical formation, and a disk gauge fast to the shaft perpendicular to the same and having a peripheral portion cut away opposite the effective cutting edge portion of the knife, opposite end portions of the cut away part of the disk gauge being symmetrical, said disk gauge forming a positive stop for the product being sliced and said knife forming a helix of pitch equal to the desired slice thickness and permitting and controlling the feed of the product being sliced.

4. In a slicing machine, a shaft, a cam-shaped knife secured to the shaft and having a portion deflected laterally into spiral or helical formation and a disk gauge fast to the shaft perpendicular to the same and having a peripheral portion cut way opposite the effective cutting edge portion of the knife, opposite end portions of the cut away part of the disk gauge being symmetrical, said disk gauge forming a positive stop for the product being sliced and said knife forming a helix of pitch equal to the desired slice thickness and permitting and controlling the feed of the product being sliced, coacting upper and lower conveyors for feeding the product to be sliced, a horizontal support forwardly of the upper run of the lower conveyor and extending to substantially the plane of the disk gauge, and a holder disposed above the support to exert a pressure to prevent vertical displacement of the article being sliced.

5. In a slicing machine, a shaft, a cam-shaped knife secured to the shaft and having a portion deflected laterally into spiral or helical formation and a disk gauge fast to the shaft perpendicular to the same and having a peripheral portion cut away opposite the effective cutting edge portion of the knife, opposite end portions of the cut away part of the disk gauge being symmetrical, said disk gauge forming a positive stop for the product being sliced and said knife forming a helix of pitch equal to the desired slice thickness and permitting and controlling the feed of the product being sliced, coacting upper and lower conveyors for feeding the product to be sliced, a horizontal support forwardly of the upper run of the lower conveyor and extending to substantially the plane of the disk gauge, and a holder disposed above the support to exert a pressure to prevent vertical displacement of the article being sliced, said holder including a plurality of spring fingers for engaging the article to be sliced at different points.

NICKOLAS J. DZIEDZIC.